United States Patent
Xu et al.

(10) Patent No.: US 9,781,307 B2
(45) Date of Patent: Oct. 3, 2017

(54) NETWORKED DIGITAL IMAGING CUSTOMIZATION

(71) Applicant: Sawgrass Technologies, Inc., Mt. Pleasant, SC (US)

(72) Inventors: Ming Xu, Malvern, PA (US); Nathan Hale, Mt. Pleasant, SC (US); Major Murphy, Mt. Pleasant, SC (US); Mike McEvoy, Monroe, CT (US)

( * ) Notice: Subject to any disclaimer, the term of this patent is extended or adjusted under 35 U.S.C. 154(b) by 0 days.

(21) Appl. No.: 15/136,019

(22) Filed: Apr. 22, 2016

(65) Prior Publication Data
US 2016/0241744 A1 Aug. 18, 2016

Related U.S. Application Data

(63) Continuation-in-part of application No. 15/076,067, filed on Mar. 21, 2016, which is a
(Continued)

(51) Int. Cl.
*B41M 5/00* (2006.01)
*H04N 1/54* (2006.01)
(Continued)

(52) U.S. Cl.
CPC .............. *H04N 1/54* (2013.01); *B41J 2/2054* (2013.01); *B41J 2/2128* (2013.01);
(Continued)

(58) Field of Classification Search
CPC ....... H04N 1/54; B41M 5/0047; B41M 7/009; B41J 2/2054; B41J 2/2128; B41F 16/02
See application file for complete search history.

(56) References Cited

U.S. PATENT DOCUMENTS 3,844,806 A 10/1974 Wegmann
3,948,828 A 4/1976 Becker et al.
(Continued)

FOREIGN PATENT DOCUMENTS

AU 200051869 10/2000
CN 1157630 8/1997
(Continued)

OTHER PUBLICATIONS

Engeldrum, Peter G., Four Color Reproduction Theory for Dot Formed Imaging Systems, Journal of Imaging Technology, Apr. 1986, vol. 12, No. 2, Society of Photographic Scientists and Engineers.
(Continued)

*Primary Examiner* — Manish S Shah
*Assistant Examiner* — Yaovi M Ameh
(74) *Attorney, Agent, or Firm* — B. Craig Killough; Barnell Whaley Patterson & Helms

(57) ABSTRACT

A geographically remote computing device transmits an image to a central computing device. The geographically remote computing device also communicates specifications of a substrate or substrates to be imaged to the central computing device. The central computing device selects a geographically remote fulfillment printer. A local, but geographically diverse distribution system is available according to the invention. The central computing device chooses the geographically remote fulfillment printer as a function of factors such as the selected image and substrate, printer capabilities, and the consumer's location. Image quality and consistency is maintained by the central computer selecting an appropriate geographically remote computing device and providing printer the appropriate instructions, rather than the instructions for printing being determined locally at the printer.

24 Claims, 15 Drawing Sheets

Related U.S. Application Data continuation-in-part of application No. 14/541,844, filed on Nov. 14, 2014, now Pat. No. 9,302,468.

(60) Provisional application No. 62/249,668, filed on Nov. 2, 2015.

(51) Int. Cl.
   *B41J 2/205* (2006.01)
   *B41J 2/21* (2006.01)
   *B41M 7/00* (2006.01)
   *B41F 16/02* (2006.01)

(52) U.S. Cl.
   CPC .......... *B41M 5/0047* (2013.01); *B41M 7/009* (2013.01); *B41F 16/02* (2013.01)

(56) References Cited

U.S. PATENT DOCUMENTS

| | | |
|---|---|---|
| 3,969,302 A | 7/1976 | Wegmann et al. |
| 3,977,828 A | 8/1976 | Becker et al. |
| 4,042,320 A | 8/1977 | Becker et al. |
| 4,042,545 A | 8/1977 | Defago et al. |
| 4,205,991 A | 6/1980 | Becker et al. |
| 4,207,067 A | 6/1980 | Becker |
| 4,265,630 A | 5/1981 | Bauerle |
| 4,265,631 A | 5/1981 | Becker |
| 4,281,999 A | 8/1981 | Becker et al. |
| 4,370,144 A | 1/1983 | Skelley et al. |
| 4,422,854 A | 12/1983 | Hahnle |
| 4,460,374 A | 7/1984 | Abel et al. |
| 4,550,324 A | 10/1985 | Tamaru et al. |
| 4,559,150 A | 12/1985 | Becker |
| 4,561,789 A | 12/1985 | Saito |
| 4,659,383 A | 4/1987 | Lin et al. |
| 4,689,078 A | 8/1987 | Koike et al. |
| 4,713,081 A | 12/1987 | Becker |
| 4,758,952 A | 7/1988 | Harris et al. |
| 4,820,346 A | 4/1989 | Nowak |
| 4,853,036 A | 8/1989 | Koike et al. |
| 4,969,951 A | 11/1990 | Koike et al. |
| 5,028,262 A | 7/1991 | Barlow |
| 5,041,161 A | 8/1991 | Cooke et al. |
| 5,065,167 A | 11/1991 | You et al. |
| 5,114,477 A | 5/1992 | Mort et al. |
| 5,164,232 A | 11/1992 | Henseleit et al. |
| 5,229,786 A | 7/1993 | Suga et al. |
| 5,250,121 A | 10/1993 | Yamamoto |
| 5,281,261 A | 1/1994 | Lin |
| 5,298,062 A | 3/1994 | Davies et al. |
| 5,350,446 A | 9/1994 | Lin et al. |
| 5,350,789 A | 9/1994 | Sagawa et al. |
| 5,372,852 A | 12/1994 | Titterington et al. |
| 5,385,957 A | 1/1995 | Tobias et al. |
| 5,421,868 A | 6/1995 | Ayalia-Esquilin et al. |
| 5,488,907 A | 2/1996 | Xu et al. |
| 5,592,204 A | 1/1997 | Lin et al. |
| 5,598,195 A | 1/1997 | Okamoto et al. |
| 5,601,023 A | 2/1997 | Hale et al. |
| 5,640,180 A | 6/1997 | Hale |
| 5,643,387 A | 7/1997 | Berghauser |
| 5,734,396 A | 3/1998 | Hale et al. |
| 5,746,816 A | 5/1998 | Xu et al. |
| 5,830,263 A | 11/1998 | Hale et al. |
| 6,197,409 B1 | 3/2001 | Bodager et al. |
| 6,284,004 B1 | 9/2001 | Burglin et al. |
| 6,286,923 B1 | 9/2001 | Sugahara |
| 6,428,134 B1 | 8/2002 | Clark et al. |
| 6,450,098 B1 | 9/2002 | Hale et al. |
| 6,674,539 B1 | 1/2004 | Serra et al. |
| RE38,952 E | 1/2006 | Hale et al. |
| 7,333,239 B2 * | 2/2008 | Oshikawa .......... H04N 1/00233 101/128.4 |
| 7,575,293 B2 | 8/2009 | Snyder |
| 7,654,660 B2 | 2/2010 | Hale et al. |
| 7,828,420 B2 | 11/2010 | Fagerquist et al. |
| 8,056,999 B2 | 11/2011 | Gardner et al. |
| 8,240,798 B2 | 8/2012 | Oshima et al. |
| 2001/0022596 A1 | 9/2001 | Korol |
| 2003/0146963 A1 | 8/2003 | Murray |
| 2003/0189609 A1 | 10/2003 | Ishikawa |
| 2008/0044587 A1 | 2/2008 | Maeno et al. |
| 2008/0246978 A1 | 10/2008 | Braveman et al. |
| 2011/0102491 A1 | 5/2011 | Kovacs et al. |
| 2013/0108285 A1 * | 5/2013 | Spink ................ G03G 15/556 399/24 |
| 2015/0029552 A1 * | 1/2015 | Nishizawa .......... G06F 3/1253 358/1.15 |
| 2016/0042255 A1 * | 2/2016 | Ganesh .............. G06K 15/02 358/1.15 |

FOREIGN PATENT DOCUMENTS

| | | |
|---|---|---|
| CN | 1608113 | 4/2005 |
| CN | 101248146 | 7/2012 |
| EP | 0525994 A1 | 2/1993 |
| EP | 0558914 | 9/1993 |
| EP | 0602885 A1 | 6/1994 |
| EP | 0622951 | 11/1994 |
| EP | 745651 A1 | 12/1996 |
| EP | 0912792 | 5/1999 |
| EP | 0893260 | 12/1999 |
| GB | 1527396 | 10/1978 |
| GB | 2189436 A | 10/1987 |
| JP | 5353414 | 5/1978 |
| JP | 60042317 | 3/1985 |
| JP | 61118477 | 6/1986 |
| JP | 6257750 | 3/1987 |
| JP | 02049070 | 2/1990 |
| JP | 02049071 | 2/1990 |
| JP | 02051566 | 2/1990 |
| JP | 02051567 | 2/1990 |
| JP | 03234772 | 10/1991 |
| JP | 05221154 | 8/1993 |
| JP | 06057656 | 3/1994 |
| JP | 2005281523 | 10/2005 |
| JP | 2008223193 | 9/2008 |
| WO | WO 02056191 | 7/2002 |
| WO | WO2007088154 | 8/2007 |

OTHER PUBLICATIONS

Symons, Pete, Digital Waveform Generation, Dec. 2013, Cambridge University Press, Cambridge 2014.
Green, Phil. Color Management Understanding and using ICC Profiles, 2010, John Wiley & Sons, Ltd., West Sussex, United Kingdom.
Millman, Jacob and Taub, Herbert, Pulse, Digital, and Switching Waveforms Devices and Circuits for Their Generation and Processing, 1965, McGraw Hill: Inc., US.
PCT International Search Report and Written Opinion, Feb. 3, 2017.

* cited by examiner

Multiple Markup Language protocol for Various Client Devices
Online graphic design and editing tool
Cloud access:
    *Substrate-dependent Image Template
    *Stock image
    *Quality Setting with Dot Gain Calibration
    *Bleed control and dimension adjustment rules
    *2D/3D image viewing
    *Encrypted metadata image file storage
Operation Decision and communication:
    — Remote Computing Device/Remote Fulfillment Printer
    —Inventory/Support Center

FIG 7a

Print File:  2d/3d Product Preview:

Blank Product:    Printed Medium:    Decorated Product:

NETWORKED DIGITAL IMAGING CUSTOMIZATION

Applicant claims the benefit of Provisional Application Ser. No. 62/249,668, filed Nov. 2, 2015.

This application is a Continuation in Part of application Ser. No. 15/076,067, filed Mar. 21, 2016, which is a Continuation In Part of application Ser. No. 14/541,844 filed Nov. 14, 2014 and upon which Applicant claims priority.

FIELD OF THE INVENTION

This invention relates to digitally customizing objects by digital imaging, and is more specifically related to a digital customizing system and method employing digital techniques, heat activated colorants for digitally customizing and decorating objects in a networked environment.

BACKGROUND OF THE INVENTION

The use of digital computer technology allows images to be easily created. Video cameras or scanners may be used to capture an image to a computer. Image creation software allows easy origination of images, as well as modification of existing images. An image that is digitally captured may be printed by a computer driven printer, including desktop size ink jet printers that will print in multiple colors.

Digital technology allows mass customization of objects. High volumes of articles may be imaged ("mass"), with each article potentially having a different image ("customization"). Single articles or low volumes of objects may also be economically customized using digital printing methods.

Mass customization offers advantages over traditional mass production methods. Unlike traditional mass production process, mass customization provides fast changes between different designs, substrates, end products, printer settings, ink selection, etc. without having to manually change machinery or operational parameters. Due to the ever faster business cycle, customers prefer to receive finished goods with customized images using the fastest possible methods. Digital technology also allows automated mass customization of objects by using networked product design, processing and logistics handling.

SUMMARY OF THE PRESENT INVENTION

The present invention is a networked imaging method for digitally decorating or customizing objects typically formed of substrates other than paper. The system may include connected digital end-user devices such as computers, internet/web based online intelligent software for graphic design, image creation or modification and image metadata processing, at least one remote fulfillment process center with a printer server loaded with color management software, controlling at least one full color inkjet printer designed for printing heat activated ink, and an inventory/support center.

Digital printing according to the invention provides consistent imaging quality, even though printing takes place at multiple locations. The use of networking provides optimal control of printing parameters irrespective of the image and colors printed, environmental conditions, and substrate to be printed. Networking also reduces delivery time and cost of the imprinted article to the consumer.

BRIEF DESCRIPTION OF DRAWINGS

FIG. 7a indicates data communicated to and from the Center Computing Device by a web/internet or cloud based server.

DETAILED DESCRIPTION OF PREFERRED EMBODIMENTS

Figure 1:
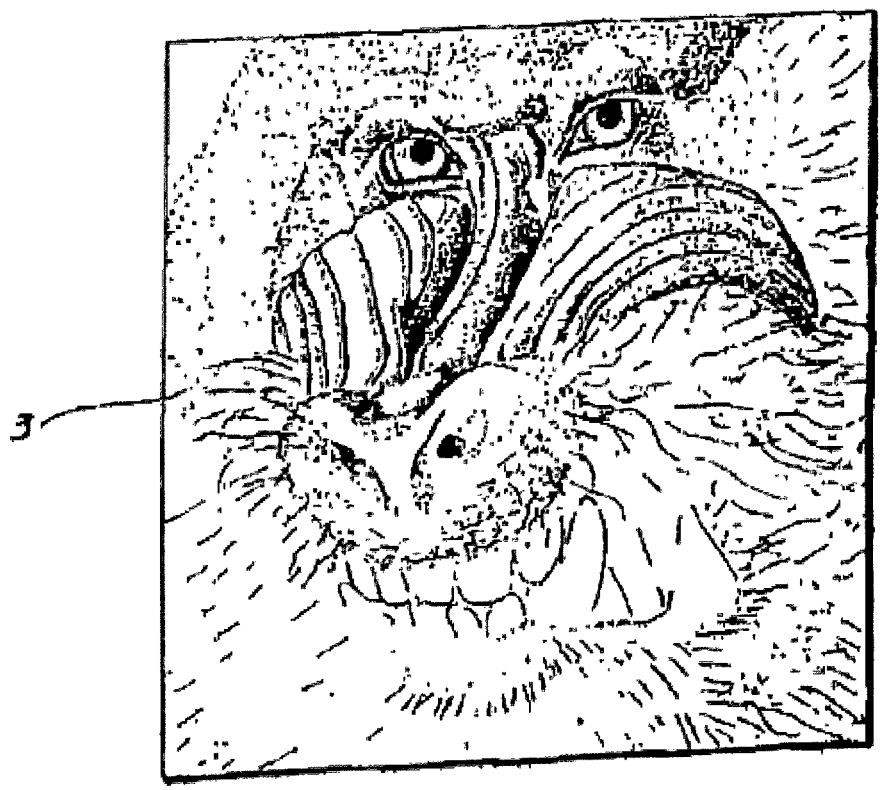
FIG. 1 illustrates an example of a design printed by a printer using the printing process.
Figure 2:
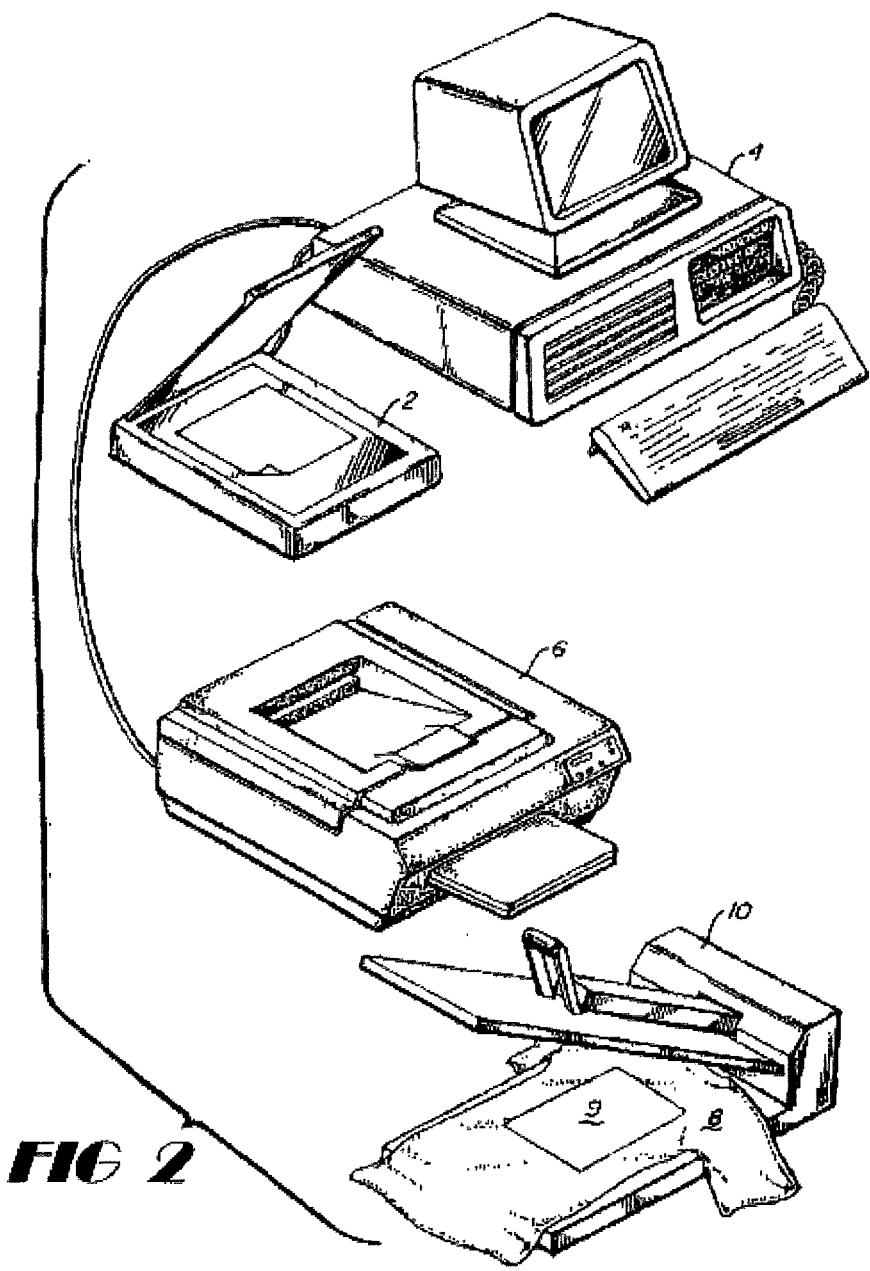
FIG. 2 is a diagrammatic illustration showing exemplary elements of computer and printing systems which could be used to achieve the printing process.
Figure 3:
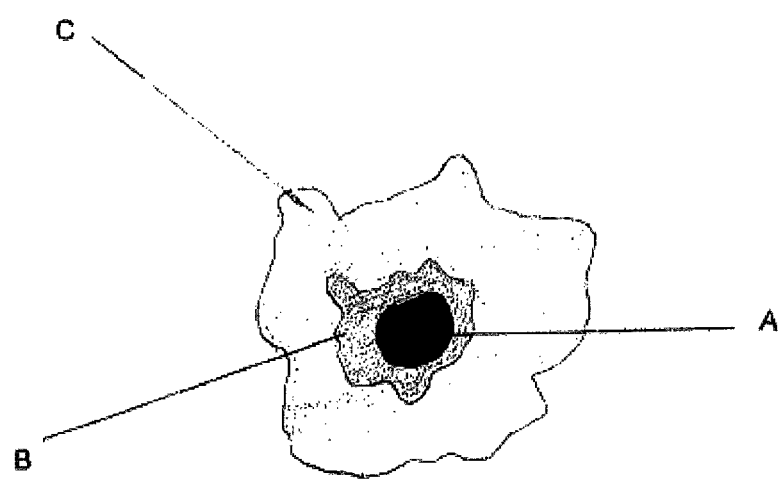
FIG. 3 demonstrates dot gain upon printing and additional dot gain after heat activation of the colorant.

A digital image is created using a computer 4, or a digital image is supplied to the computer. The computer directs a printer 6 to print the digital image. Any means of forming a digital image that may be printed from a computer may be used. For example, computer design graphic software may be used, or photography may be used. As shown in FIG. 2, the design may be read by a scanner 2 and the design communicated to a computer 4. The design may be photographic, graphic, artistic, or simply letters or words. The use of cyan, yellow and magenta, and optionally, black ink compositions allow the printer to print in full color or multi-color designs.

The printer prints the image 3 onto a medium 9, which may be paper. After the image is printed onto the medium, the image is positioned against the final or receiver and activated by the application of heat and pressure from a heat supply 10. The image is permanently transferred from the medium to the final or receiver substrate by the application of heat and pressure. For example, the image may be transferred onto a textile substrate, such as a shirt 8, although the image may be transferred onto other materials as a final substrate, such as metal, ceramic, wood, or plastic. The design 3, which is printed onto the medium 9 without activating the ink, is placed against the final substrate which may be a shirt 8. A temperature which is sufficient to activate the dye is applied by a heat supply such as a heat press. This temperature will typically be about 200 degrees Celsius. This temperature is applied for a time sufficient to heat activate and transfer the ink solids in accordance with the requirements of the invention.

A heat supply such as heat transfer press 10 may be used to accomplish transfer of the inks from the medium to the substrate. In the embodiment described, activation, or sublimation, of the dye or colorant does not take place at the time of printing the image onto the medium, but occurs during the transfer from the medium to the substrate. In another embodiment, the image is printed onto the final or receiver substrate, and the colorant is heat activated after printing by the application of heat to the image.

The process described herein allows custom decoration of small or large quantities of objects ranging from clothing to housewares to personal items formed of substrates that have an affinity for the heat activated colorants used with the process, either through remote or local access. The process permits different images to be printed in uninterrupted succession by the printer. Objects formed of different substrates may be imaged from the printed media, also in succession. For example, the printer can print a series of images, a, b, c, d . . . x, y, z, in succession, wherein each of the images is different from the other. Each of the images printed on the media is printed to specifications that yield optimal quality on a specific substrate for which the image is intended. For example, image a may be intended for a textile substrate; image b for a different textile composition from image a; image c intended for a ceramic, image d for a ceramic of curved shape; image e for a wood substrate and image f for a metal substrate. To obtain optimal quality, such as photographic quality, the characteristics of the printed image, as well as the image itself, must be adapted to the substrate. Factors such as two levels of dot gain and other factors must be considered, and the performance of the printer changed for each image, as described herein for developing a data matrix. At the same time, especially by using a computer driving multiple printers, this process of custom decoration of objects can be achieved on a commercial production basis using various size printers developed for the process.

The printer preferred to be used with the present invention is a full color piezoelectric drop-on-demand inkjet printer that will image a substrate, such as paper. Other types of full color digital imaging printers may also be used when such printers achieve consistent imaging quality.

Printing involving colorants that are activated or transferred by heat is sensitive to ink types, environmental and other operating parameters, and material substrates. Final image quality, such as color quality and resolution, depends on factors that include substrate dimensions and shape, substrate composition, surface conditions and absorptiveness, and ink or colorant types. Different substrates may require different heat activation inks or colorants, printing, fixing or transfer parameters in order to achieve better outcomes in both quality and longevity.

The term "dot gain" is used to describe the enlargement of printed ink dots from their intended dimensions. In non-heat activated printing techniques, dot gain is due to ink migration from mechanical impact when ink droplets hit the substrate and the interaction between the ink and the substrate. However, in heat activated imaging processes dot gains are produced by both the printing process and by subsequent heat activation, both of which critically impact the final image quality. Typically, correction of dot gain requires experienced operators who manual tweak ink usage, a method that often lacks accuracy and consistency.

Inkjet printing with aqueous (water based) inks comprising heat activatable colorants results in dot gain. Dot gain materially impacts image quality. First, when ink is printed using a 150 lpi (line per inch) resolution onto a substrate, which may be the intermediate substrate 9, the printed ink dot may gain 5 to 10% in size at a midtone area of an image. The ink dot gain may be due to mechanical impact or on-printer heating, liquid migration of the ink on the media by gravity or capillary forces, or by rimming, or by spreading/wetting behavior, such as a surface/interfacial energy value difference between the substrate and the liquid ink.

Additional, or second level, dot gain occurs when inks comprising heat activatable colorants are used. Second level dot gain results from heat activation of the colorants. The level of energy applied to the printed image, primarily in the form of heat, is typically much higher than energy applied during the process of printing the image onto the substrate by the printer. Depending on the properties of the ink, the substrate, the heat activating parameter, and the ink droplet size, second level dot gain may be as high as several hundred percent when compared to dot gain experienced during the printing step.

Figure 4:
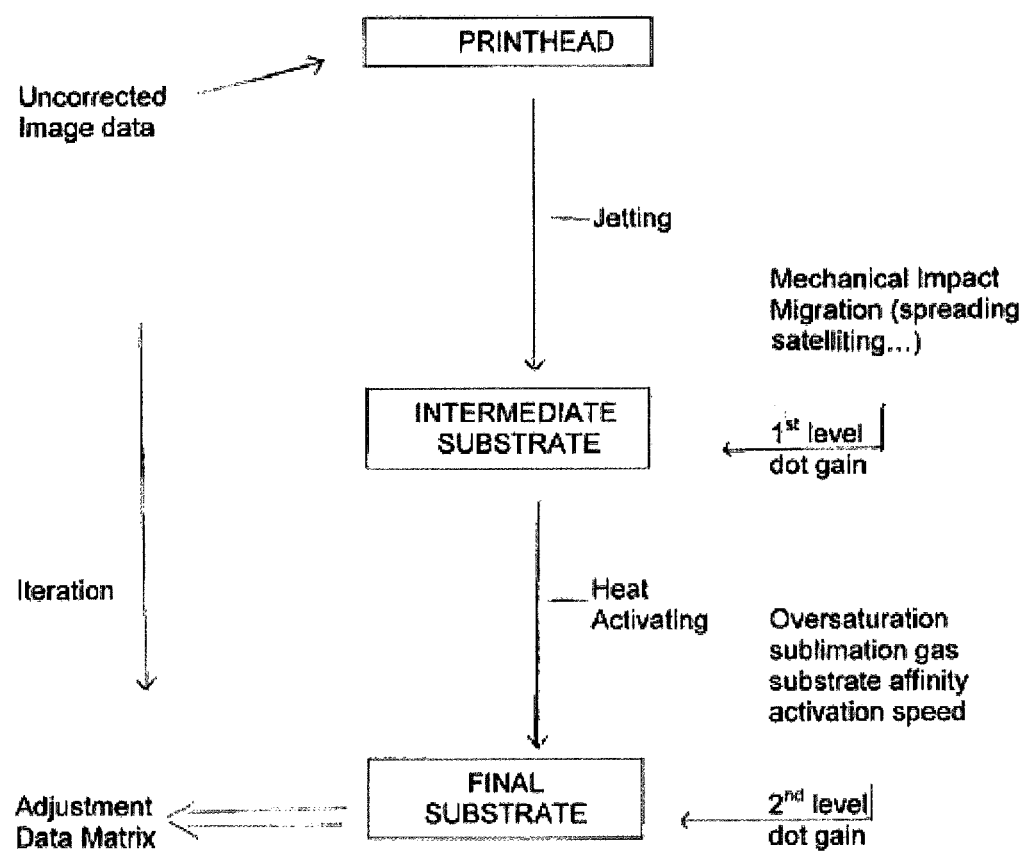
FIG. 4 is a flow chart indicating dot gain factors during the printing process.

FIG. 4 demonstrates the two levels of dot gain. The intended image dot size (A), upon printing on the intermediate substrate, may diffuse and increase to size (B). Upon heat activation, the dot size (C) is further increased on the final substrate. Two levels of dot gain, where the second level is the product of heat activation, is not encountered in simply printing an image on paper by means of a desk top size inkjet printer.

Dot gain, and particularly second level dot gain, must be controlled in order to obtain high definition, high-resolution image with faithful reproduction of photographic images when using heat activatable colorants. This is especially important in generating color images having a half tone area, or having fine details, where small and discrete ink dots are required for both physical resolution and color resolution. In addition, the magnitude of dot gain resulting from the energy activation process cannot be satisfactorily corrected or controlled by conventional methods, such as graphic application software, or color management/profiling tools, in order to achieve high resolution quality. High resolution printing techniques that are successful in conventional printing with small printers, using water soluble dyes printed on paper, are not satisfactory when using aqueous inks comprising heat activatable dyes or colorants that are insoluble, or sparingly soluble, in water. Such techniques tend to achieve only a fraction of the desired resolution in applications when the second level of dot gain is not considered, or is inadequately considered, as has been the case with the use of prior art printers and printing processes using liquid ink comprising heat activatable dyes or colorants. Conventional printers and print techniques have not adequately considered inkjet droplet formation for aqueous inks comprising heat activatable colorants.

Figure 6:
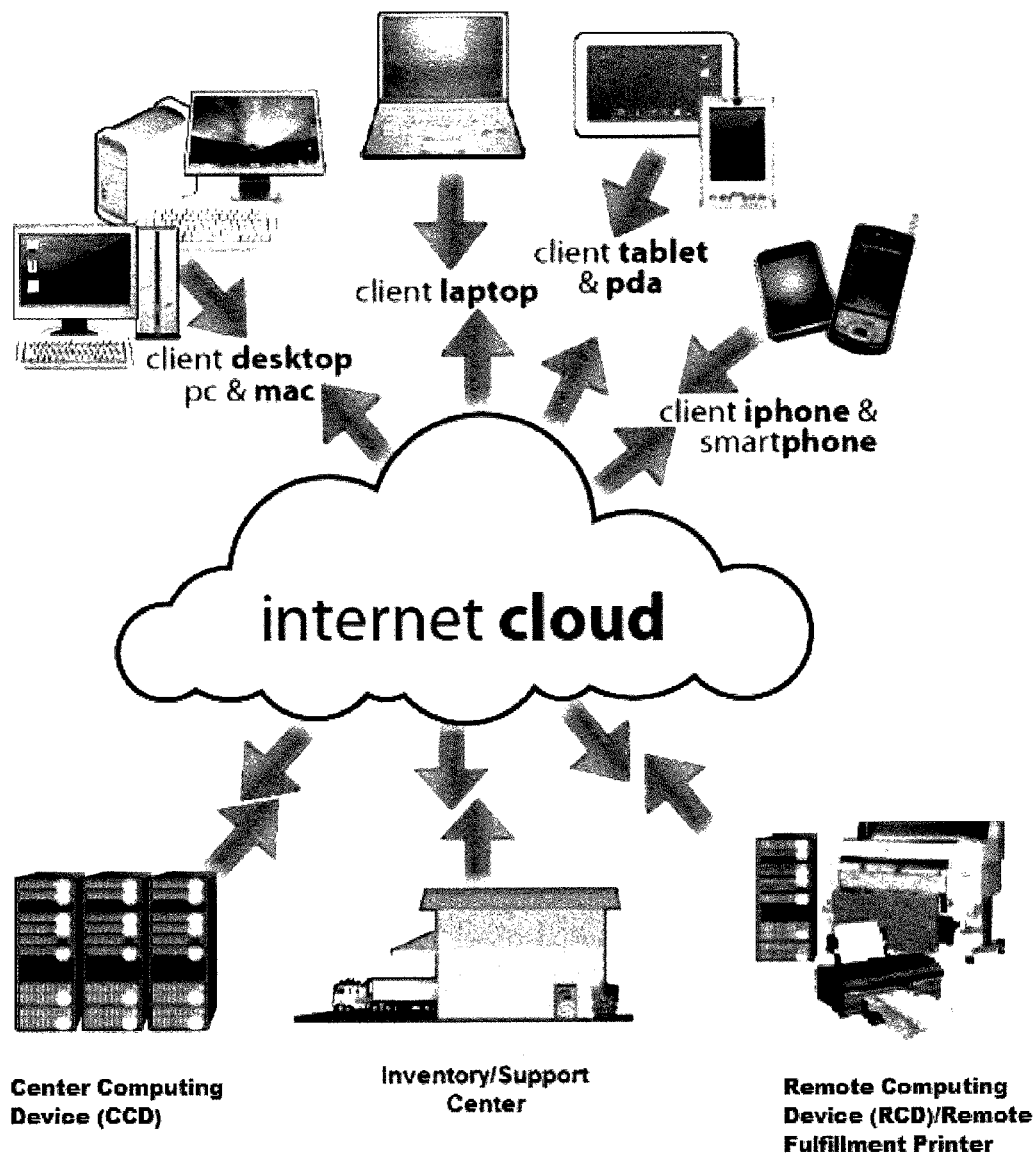
FIG. 6 depicts an automated network system including various components.

In one embodiment, a mass customization system and method of imaging is employed. FIG. 6. A web/internet or cloud based server provides end users with an interface for customized image design and product order processing, an internet or cloud linked a center computing device (CCD), and an internet or cloud linked inventory and order support center for supporting activities. Dot gain levels, and especially dot gain as it relates to heat activation of imaging materials such as inks, are fully considered and controlled from initiation of the process through completion of the process.

A web/internet or cloud based server, which may be designated as a Center Computing Device (CCD), may be connected to the Internet and linked to multiple client devices. A client device is a digital device that is capable of connecting with and communicating with a network, and is preferred to be able to download, modify and transmit digital images. The device is preferred to be able to accomplish customized ordering, typically using network interface tools, which may be provided by the operator of the CCD to the client. Examples include independent computers, tablets, PDAs, smart phones and the like. The invention comprises at least one remote fulfillment process center where a remote computing device (RCD) resides, and at least one Inventory/Support center. Products that are imaged by the heat activated imaging method may be directly and intelligently graphically designed, modified, and ordered from remotely situated client devices.

The internet or cloud based CCD is a computation server that provides tools and database(s). The CCD may comprise multiple markup language interfaces and protocols that enable various end user or client devices to access the CCD. These user devices include, but are not limited to, desktop computers, laptop computers, tablets/phablets, smartphones or personal digital assistant (PDA) devices, which may be of various operating systems. The computation server may provide graphic customer design tools that can be accessed and operated from the user devices, allowing on-device quick design and product ordering, and eliminating the need for a user to own expensive graphics design software.

FIG. 7a demonstrates other components of the server that assist the customization process. These components include, but are not limited to: substrate-dependent image templates, stock images (and/or text fonts), quality or resolution (due to dot gain, etc.) components, bleed control and dimensional adjustment rules, 2D or 3D image viewing of intended image objects with color accuracy calibrated for the device, metadata encryption or encoding for secure transporting through the internet/cloud, and finished metadata storage and queuing communications.

In order to faithfully produce a customized image on a selected substrate two levels of dot gain correction are embedded in the design. This is especially important when sharp and crisp edges of an image are required on a hard, non-absorptive substrate. Depending on the selection of the substrate, dot gain correction not only eliminates heat activation imaging process quality distortion, but also ensures that what the user views from on an output device, such as a web browser, is consistent with the finished product, both with regard to color accuracy and image fine detail reproduction. Depending upon the substrate, ink, process parameters, and/or other specific needs or requirements selected, instructions are given to the remote fulfillment process computing device (RCD) for matching printing parameters such as printhead waveform, piezo pulse frequency, driving force (voltage) or pressure, ink droplet size (grey scale), heat fixing of the image or other transfer process parameters.

Many substrates used for imaging by heat activation of inks or colorants require surface treatment, such as coating the substrate with synthetic materials. For instance, ceramic materials are coated with polyester or polyurethane to provide effective reception of heat activatable images. Natural fibers and many textile substrates require similar treatment to achieve vivid colors upon heat activation to permanently bond colorants to the substrate. Heat activation may be limited by the shape and size of heat fixing or transfer equipment, such as a heat press. Only the areas of the substrate that are within the dimensions of the heat press (or other types of heat activation equipment) are imaged successfully.

The web server CCD software provides an intelligent application that is available to a remote user having minimal local design tools. The data base of the server contains detailed substrate information. Areas of the substrate that are available for imaging, and the image dimension/shape are selected from the client device, and are automatically adjusted to ensure proper coverage of the final, image receiving substrate, without leaving undesirable void or blank areas. This feature is referred to as the "Bleed Control Rule."

The Bleed Control Rule of the CCD software may be applied when the final, image receiving substrate is dimensionally smaller than the dimension of the heat press or other heat activation treatment equipment. An image will be enlarged, or occasionally, shrunk proportionally along both planar sides to provide a borderless imaging of the object. The Bleed Control Rule may prevent inconsistent borders on the object, achieving a superior aesthetic result, while covering the entirety of the object. This technique is especially useful when the object to be imaged is small, and coverage of the entire imagable area of the object is desirable.

The web server CCD intelligence software may adjust printing resolution based upon the selected substrate to be imaged. For example, a 75 line-per-inch loose weave textile substrate requires printing resolution that is generally no higher than 150 dots-per-inch. A higher resolution will not achieve higher image quality for loose weave textiles, but will consume more ink and require a longer printing time. On the other hand, a coated metallic substrate may be able to receive the highest possible photographic image quality a printer can provide. Lookup tables of various substrates may be employed by the intelligence software that corresponds to efficient printing resolutions.

Figure 7B:
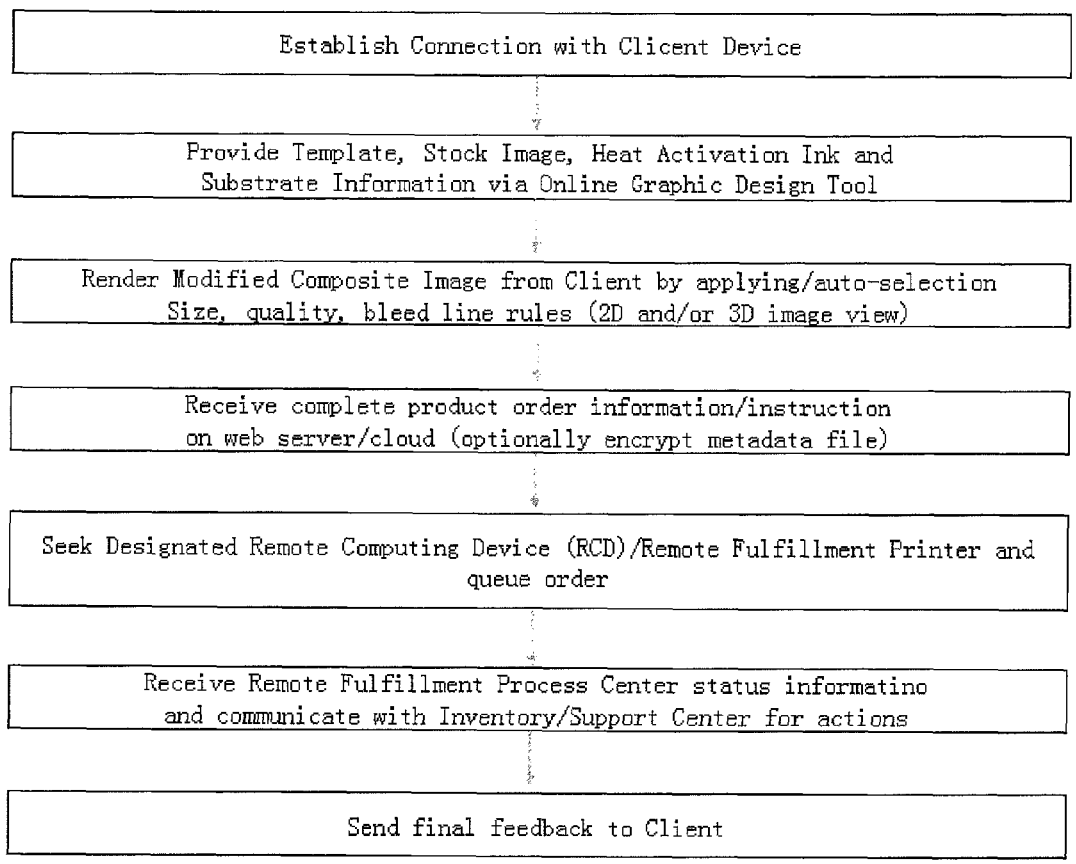
FIG. 7b is a block diagram of an example workflow of a networked order function.

FIG. 7b depicts an example of a workflow process employing CCD software. Upon establishing a connection between the CCD and a client device, using a web browser, a substrate to be imaged is selected. A local image that resides on, or is locally provided to, the user device may be loaded into the template for tweaking, overlaying, and/or dimensional adjustment of the image. Alternatively, an image retrieved from the stock image collection of the CCD may be used. Color selection, shape and intensity, and the addition of text with various fonts and artistic effects may be used to provide a final composite image suitable for imaging the substrate. Quality/resolution, based on substrate selection and dot gain information, and Bleed Control Rules may then applied as options, followed by a 2 or 3 dimensional review on the device. A work-in-progress file may be temporarily saved or added on the HADIMC/cloud, and sent to the customer or client device for approval or further editing through a virtual realistic look prior to final composite image storage on the HADIMC. After the user is satisfied with the design or modification, other relevant information may be added to fulfill the final product order request. This information may include, but is not limited to: number of items to be imaged, date and/or time of delivery, and a preferred location for pick up or shipment. A metadata file comprising this information is saved on the CCD server or cloud for operational purposes. The CCD software automatically (or manually, if desired) seeks an appropriate remote fulfillment process center for fulfillment of the customer's/user's order. This information is displayed or printed for documenting the operation at the corresponding processing center.

The web server CCD software also monitors the status of each remote fulfillment process center to monitor inventory (substrates, intermediate media, ink, hardware, and supplies) and/or service needs or abilities. Feedback related to customization production, such as cost, date/time-to-deliver, shipping and handling, etc. may be sent to the client device or other designated location through the CCD.

Figure 8A:
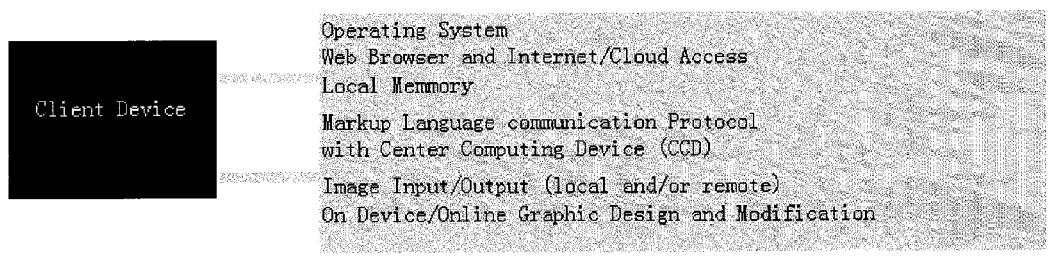
FIG. 8a shows functionality of a Client Device.
Figure 8B:
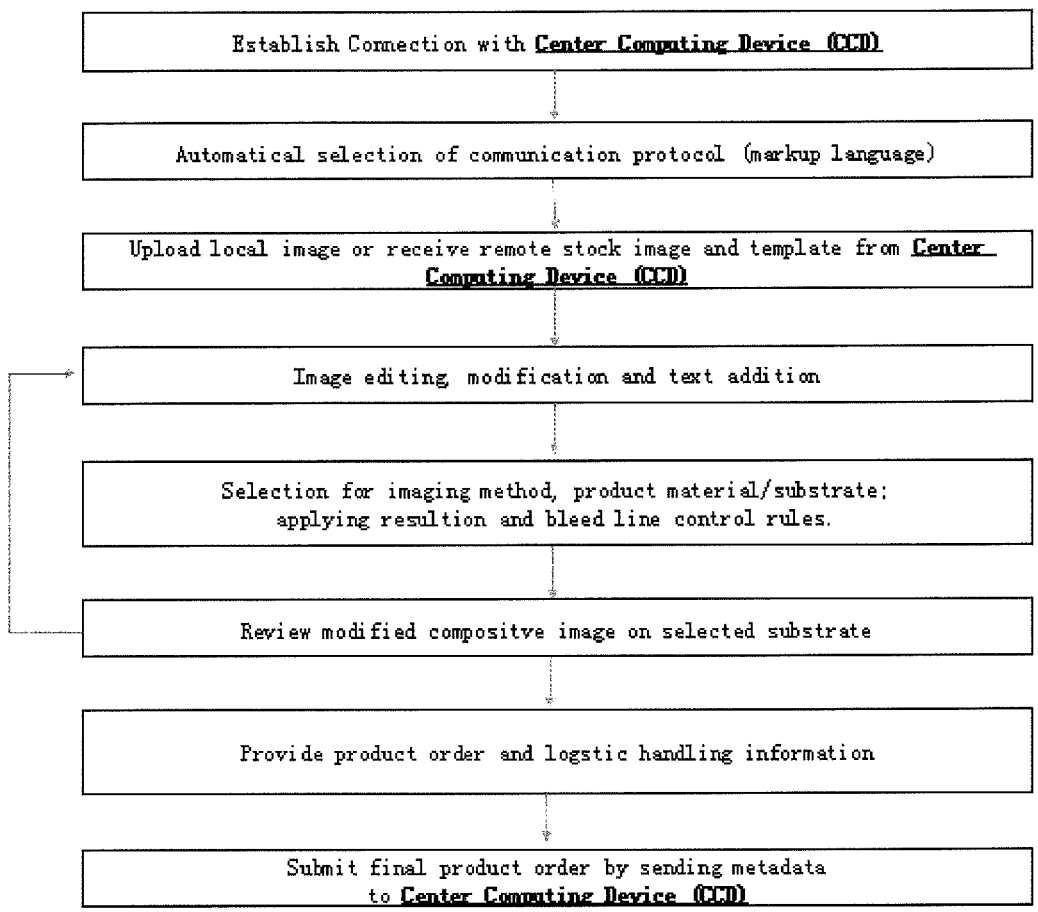
FIG. 8b is a block diagram of Client Device facilitating graphic design tools, image and substrate information, processing order through Center Computing Device FIG. 8c demonstrates a graphic design and manipulation process according to an embodiment of the invention FIG. 8d demonstrates an image design and viewing process using product template according to the invention

FIG. 8a illustrates functions and FIG. 8b shows workflow processes at the client device. After connection with web server CCD, an automatic selection of program language protocol, such as hypertext markup language, is selected by the user interface for the device browser to engage in tasks required to fulfill the customized design and product ordering process. Depending upon the complexity of the operation, and/or the internet connection speed, either local device memory or memory blocks on the CCD may be used for temporary working image file storage, and for convenience in the event of further modification. This combination of using both the cloud and the user's local device RAM or temporary memory gives a quick and fluid user experience. Final metadata files, including the composite image, substrate/product choices, shipping and handling, etc., will be encoded or encrypted and saved at the CCD location for execution of order fulfillment.

Though both vector and bitmap image types may be used, image files of various formats may be loaded to the online graphic design/modification interface of the present invention, including TIFF/TIF, PNG, JPEG/JPG, GIF, etc. High quality image file types such as PNG with both grayscale and RGB color features, 8 bit color quality or better, and with a transparency option for further modification, are preferred. Lossless compression of images during internet transmission is also desirable. Preferred final (ready-to-print) and fully rendered composite image file types include PNG and PDF.

Figure 8C:
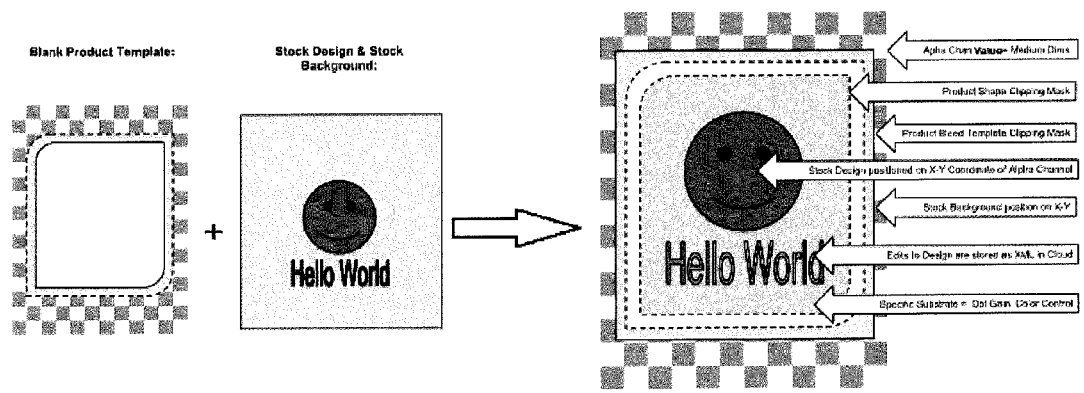
Figure 8D:
Figure 8D:

In an embodiment of the invention, at the client device browser, a blank product template with a background is first provided by the webserver (CCD), including template size (medium size), and product/substrate shape (FIG. 8c). A photographic image, either uploaded from the local client device browser or from a stock image database at the CCD, is placed onto a blank canvas or inserted into a template's existing canvas for the creation of a design. The design may comprise image content, and may include text with desired alpha channel values, or both. A "canvas" as used in this embodiment is a two dimensional plane, with specific pixel width and pixel height, having multiple-layers onto which the user positions raster images and vector objects, including text and/or images. These layers are stacked atop one another. The alpha channel value, or alpha value, of a pixel, in addition to RGB values, on a layer determines the transparency, or the degree of visibility to lower layers. For example, the layer ordering determines whether added text is visible in front of an image or hidden behind. The canvas is precisely sized and dimensioned for the printing medium (or intermediate medium), which endures the image scaling properly during the printing process. Program subroutines from either or both sides of CCD and client browser are used to edit the image design, including Text, that is to appear with the image. The combination of the Alpha Channel values, plus the X-Y coordinates determine where on the medium the image and the text will be placed in different overlapping layers. A product can be a unique shape (Product Clipping Mask), and a slightly larger Bleed Clipping Mask (bleed control rule application) may be used to allow for full bleed printing ("edge-to-edge" or borderless printing). Upon previewing and confirming (FIG. 8d), a fully rendered composite image viewed as a fully trimmed realistic image on the selected substrate may be saved as a printing file, with parameters used to optimize the product. Such parameters include printing resolution, spot color replacement/independent ink channel control, two levels of dot gain calibration and adjustment, color management through linearization, ink limiting, ICC profile correction, and/or waveform selection, etc. to best suit various product substrates such as ceramic, wood, plastic/polymer resinous composite, metal, or fabrics.

Information regarding other operational or processing aspects of the customer's order may be added as metadata to the printing file prior to queuing into the webserver/cloud, or being sent to a corresponding remote fulfillment process center. A quantity of each ordered product, delivery time, shipping/handling instructions, or pick up time/location may be information provided as part of the order process.

The web based graphic design software accessed via a client device allows the device user to retrieve saved images for further modification, or for future applications, during subsequent user sessions. Customer identification and/or customer order identification may be used for the purpose of session continuation and/or future design and order processes. A user may be enabled to use different devices for different working sessions, as long as program communication protocols can be established between CCD and client devices.

A markup language (including scripting language) may be used to produce a user interface (UI) facilitating communication between CCD and the client device for purposes that include image editing/modification. Examples of markup languages include HTML/HTML5, XTML, WML (for wireless devices), and Javascript/JSON. Combinations of various markup languages may be used when necessary to enrich the functionality especially graphic design and modification operations. On the other hand, different types of server-side scripting may be used by the web server (CCD), including PHP, ASP.NET/ASP.NET MVC, WebForms, etc., to generate the markup language content that is delivered to the client's browser to render the user interface (UI).

The following is an example of a segment of the markup program language applied at CCD through client user interface (UI) providing five different substrates available for selection. Once selected, other corresponding information may be determined and to be saved in the metadata content.

```
GET https://webserver.company.com/api/substrate/list
JSON Response:
{
    "Data": [
        "Substrates": [
            "Mug",
            "T-Shirt",
            "Metal Sign",
            "Sweatshirt",
            "Jersey"
        ]
    ],
    "Success": true,
    "Errors": [ ]
}
```

Other information may be treated similarly, and may or may not be transparent to the client, such as dimensions, available shipping carriers, and the like. Information associated with the job processed at CCD, but which is not transparent to the client may include operating parameters, dot gain lookup table calculation results, printhead waveform selection commands, etc.

Figure 9A:
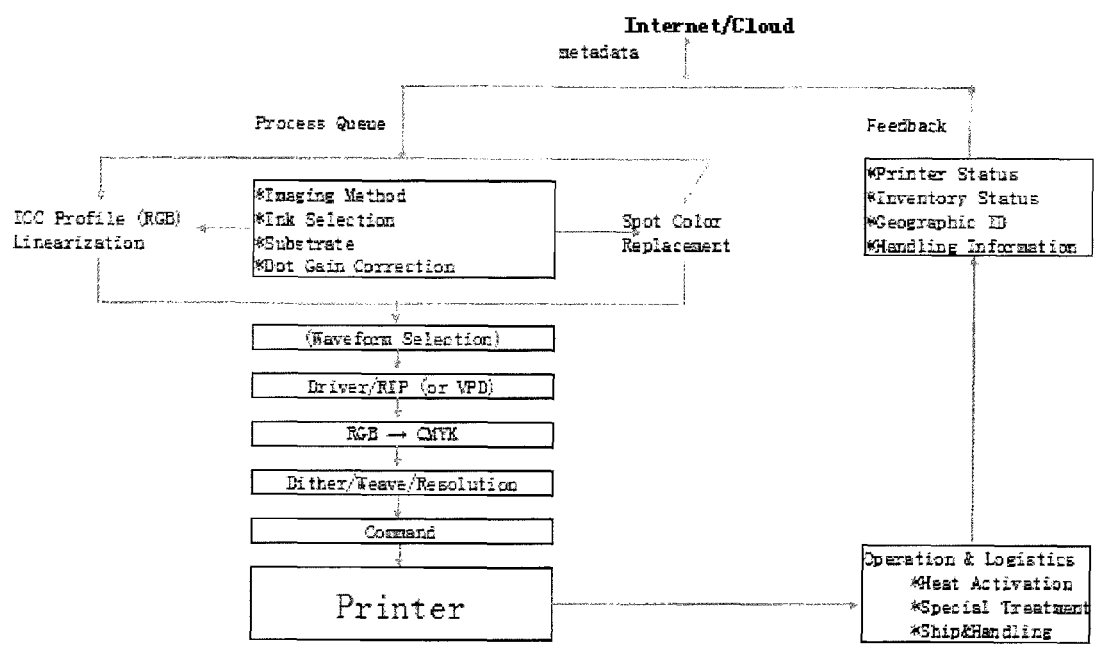
FIG. 9a is a block diagram of remote fulfillment process center for fulfilling customization orders.

FIG. 9a illustrates a typical workflow of a digital imaging processing at remote computing device (RCD), or directly from center computing device (CCD) to remote fulfillment printer. Processes including printing, heat fixing or heat transferring, substrate pre- or after-treatment, cut-and-sew, quality assurance/quality control, packaging, shipping and handling, each of which may be performed and completed at the remote fulfillment process center. A remote computing device (RCD) connected to at least one digital printer with heat activated ink is linked directly with web server CCD. Multiple printers may be connected to the remote computing device (RCD) for high efficiency, high throughput manufacturing operations. A remote computing device (RCD) may be an independent electronic data processing center such as a desktop computer, a laptop computer or computer server loaded with software applications that communicate and pass commands between CCD and local printers. At least one data operating system is used, such as Microsoft Windows, Linux, or Apple OS X.

Figure 9B:
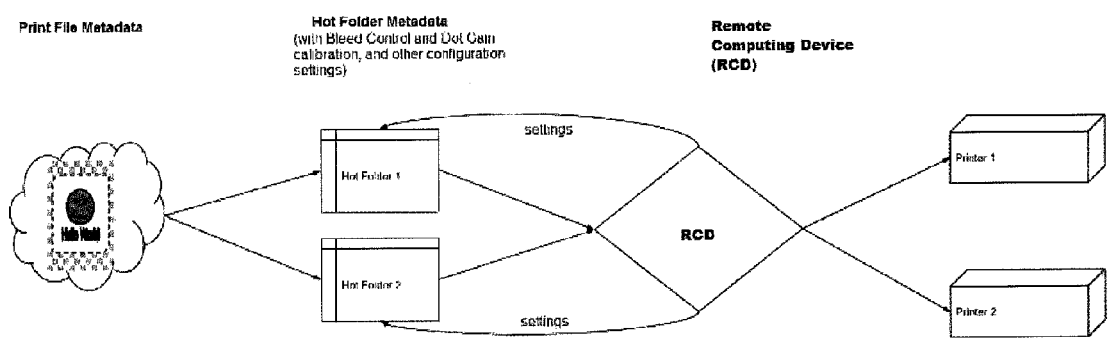
FIG. 9b is block diagram of metadata management and printing control through Hot Folder storage

One preferred embodiment of the present invention divides the cloud storage at the CCD into multiple and separate "hot folders" designated for different remote fulfillment process centers or remote computing device (RCD) that are remote from each other (FIG. 9b). Metadata files created from the client device may be accessible at each of the three locations as shown (client device, CCD, and RCD) for further editing, storage and/or processing operations. Different privileges may be assigned or changed for editing, coding/encoding, grouping/regrouping of medadata files for different RCD and/or client devices when such changes are needed. Depending upon the selection method hot folders may be categorized as, for example, according to printing method, ink type, substrate, printer, processing equipment, etc. This method enhances organizing efficiency and reduces the possibility of mismatching among various criteria used in the processes. The following markup language exemplifies inserting a processed composite image file "My design-.png" into a printing hold folder in the cloud. A white color t-shirt is used as a substrate for printing my a type of sublimation ink using waveform "Std A" at the corresponding printer.

```
POST http://webserver.company.com/api/print_hotfolder_3
JSON Request:
{
    "Design" : "My design.png",
    "Substrate" : "T-Shirt",
    "Color" : "White",
    "Inktype": "Sb05",
    "Waveform": "Std A",
    "Location" : "Auto"
}
JSON Response
{
    "success" : true,
    "jobID" : 911B873CF
}
```

Figure 9C:
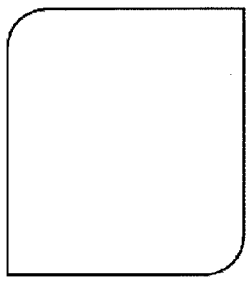
FIG. 9c depicts a transfer imaging process of a substrate.
Figure 9C:
Figure 9C:

FIG. 9c demonstrates a uniquely shaped blank product imaged by a heat activation transfer imaging process, incorporating a printing medium (intermediate medium). Note that the printed medium is the same size as the printed file and that metadata such as substrate, print quantity, spot color replacement, ICC profile are taken into consideration. The printed medium is placed in contact with the blank product where heat is applied to activate the ink and permanently bond the image to the substrate.

The inkjet printer of the present invention preferably uses high resolution printheads that are preferably supported by firmware having an embedded algorithm calibrated with a data matrix that is dictated by the imaging characteristics of the specific heat activatable ink used. In particular, characteristics for both the first and second levels of dot gain are taken into account for selected substrate(s) and heat activation parameters. Depending on the incoming fulfillment requirement with quality/resolution information, the algorithm calculates and anticipates the final resolution/dot size, and adjusts printhead jetting behavior and ink droplet volume accordingly throughout the entire image printing cycle, based on the specific, final needs of the image, which is unique for each heat activatable ink application.

The embedded algorithm may be preset on the printer/printhead firmware, but preferably on the RCD and connected to the printer. The embedded algorithm may be adjusted or updated with data that is best suited to the ink and substrate to be printed. Ink characterization and controls may be used prior to printing, or during printing, of the substrate performed by the RCD. Though managed by the remote computing device (RCD), various types of controls may be employed, either directly, or through a variety of software communications, such as a printer driver, raster image process software, color management/profiling software, add-on for graphic application software, etc., as demonstrated in FIG. 9a. In addition, the level of control and degree of adjustment may be different for each ink color channel of the printer to best match color or image quality requirements.

The ink dot gain calibration and/or adjustment data matrix may be achieved by collecting information from factors such as ink color, the specific heat activatable colorant used, intermediate substrate characteristics, heat activation parameters, jetting behavior, and droplet size used to generate each color of the image. (FIG. 4) This determination may be made by empirical observation of actual printing of selected imaged substrates based upon measurements taken by instrumentation, such as a densitometer. The review is similar to a color profiling process, but with particular analysis and measurement of dot gain data. Multiple iterations may be needed to achieve a preferred data matrix that yields high quality and accurate imaging.

Figure 5:
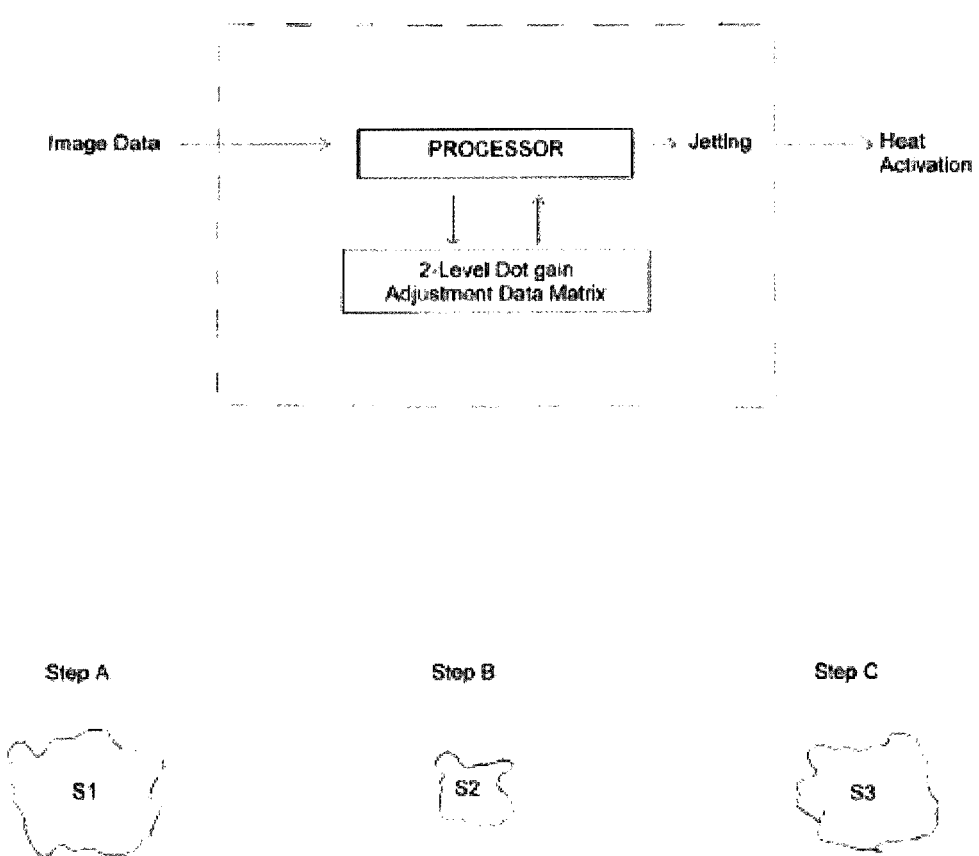
FIG. 5 is a flow chart demonstrating processor adjustment for dot gain control, and dot gain results from the adjustments.

FIG. 5 demonstrates the dot gain adjustment process when the factors listed above are considered. When image data is sent to a printhead (Step A), ink dot size (S1) represents a desired ink dot size for each color element after heat fixing of the colorant to the final substrate. Anticipation of dot size and adjustment of jetting are made based upon the adjustment data matrix, which provides information for correction based upon ink droplet size/volume, color combinations, dithering orientation and/or overlapping techniques. From this information, the printhead generates a corresponding dot size of S2, which is smaller proportionally for dot gain correction purposes, that is printed on the intermediate substrate and prior to heat activation. Upon activation of the color image, the colorants forming the image obtain their final color, size and shape on the final substrate as the final size of S3. With a carefully fine-tuned algorithm and data matrix control including ink droplet size adjustment/waveform change, ink/color saturation level correction which impact both levels of dot gain adjustment, S3 will be as close as possible to the desired (S1) dot size in both size and color accuracy.

A preferred printhead has at least two arrays of printing nozzles that are offset with at least one nozzle position in alignment with another. To achieve high quality imaging, a linear nozzle resolution of 150 nozzles per inch or higher is desired. That is, each nozzle array has at least 150 printing nozzles per inch along the direction of the array. The nozzle arrays may be fed by different ink reservoirs or ink tanks, each of very small volume or capacity and positioned inside the printhead upstream from the piezoelectric mechanism, or the nozzles may share one ink reservoir in order to gain high-speed printing, or to improve native printing resolution. By using various physical mounting configurations, and/or applying multiple printing passes, jetting frequency, and/or advancing motor and scanning motor stepping gaps, as well as jetting variable size ink dots (ink droplet with different volumes), native printing resolution of 600 to 1440 dpi, or more, may be achieved, depending on specific ink droplet volumes.

To achieve proper droplet formation with well-defined jetting outcomes careful selection of the jetting waveform or wave pulse is employed. The voltage-time function may be single, double or multiple-peak in shape, depending on the fluid flow dynamic behavior of the heat activatable ink of each and all colors used. Overlapping of multiple pulses with various amplitudes (voltage), shape (for example, rectangular, triangle, sine, etc.), and durations (both pulse and dead time) may be used to secure successful pinch off of droplets while minimizing satellites from jetting of the ink.

Multiple sets of printhead performance data, such as waveform, may be stored or accessible by RCD from the cloud to drive a printer or printers connected to the remote computing device (RCD). This enables a change of jetting droplet size (small, medium or large), frequency/speed, and jetting quality to match different ink physical properties such as viscosity, surface energy, and specific gravity. Ink physical properties may also be impacted by temperature and humidity conditions where the printer/printheads are located. Optimal printer performance and print quality may require the use of a calibrated set of waveforms. Automatically switching and adjustment by the RCD can minimize or eliminate human operator errors in a highly efficient manner in operation. This is especially useful when one printer is equipped with two or more sets of inks, each having different physical properties and/or performance characteristics. Examples include regular four process-color inks (Cyan, Yellow, Magenta, and Black) plus light color inks (such as light Cyan, light Magenta, and light Black, and/or a clear ink), where more than one printhead is used, and different optimal driving waveforms are preferred in order to reduce primary and secondary dot gain.

Optimal printhead driving parameters such as waveform, pulse frequency, ink droplet size, pressure, and voltage, may be obtained by tweaking drop-on-demand (DoD) printhead piezoelectric controller parameters, including voltage height, shape, and time span/duration. This process is typically performed using an ink droplet analyzer or ink droplet observer where video recording or high speed cameras are used during experimental printhead nozzle or channel jetting to compare performance at various settings for each unique printing ink. Settings in binary form for the most suitable waveforms at a desired driving frequency may then be stored and provided to the printhead controller prior to performing a printing job. Typically, a trapezoidal waveform is used for aqueous based inkjet inks but the special parameters must be fine-tuned to achieve the required resolution, speed, and/or cleanness (the least degree of satellites, tailing, or the like).

In an application where a single drop-on-demand piezoelectric printhead is used to deliver or jet multiple color inks, whether process-color, spot color, fluorescent color or a combination of various types of inks, it is important that the physical properties of the inks are similar so that the response to the selected driving waveform and/or frequency is substantially the same for each. Generally speaking, physical properties of the ink related to driving behavior include rheology or viscosity, surface and interfacial tension, specific gravity, solid sedimentation behavior, liquid evaporation speed, and the impact of temperature sensitivity on these properties. Careful control of these properties by adjusting different ingredients in the liquid jetting inks may be crucial to jetting performance and consistency of the inks.

When an order is received at a remote fulfillment process center from the center computing device (CCD), the remote computing device (RCD), the encoded or encrypted metadata file is decoded or decrypted. Information regarding the specific image file and instructions are released by the RCD to the manufacturing process. Proper parameters for printing (waveform, driving force, color management, ink limiting, imaging resolution, dithering, independent printer ink channel control, etc.), consumables (ink type, paper or intermediate substrate, substrate/final media), procedures (material preparation, after-treatment procedure, etc.) and shipping and handling preferences, etc. are employed accordingly. Operating personnel may then follow the instructions at specific printer(s) and equipment to finish the tasks.

The Remote Computing Device (RCD) used in an embodiment of the invention carries a geographical identification signal by using a geo-location application programming interface (API), indicating the geographical location (latitude and longitude) of the remote fulfillment process center for the purpose of cost calculation of shipping and handling, pickup or delivery, etc. This signal may be communicated with center computing device (CCD) for operation and task control and monitoring. A variety of mapping API services, including commercial services such as UPS, Fedex, USPS, may be used for cost estimation or calculation. Customer or client devices may have the option to select from various process locations from the online design and ordering software for selection of the preferred delivery method. For instance, a traveling customer may design his product order from Denver, Colo., U.S.A, and choose to pick up his order from Moscow, Russia, where he is to present the product to his hosting party. A remote fulfillment process center in Moscow or at its nearest location may be recommended and chosen by CCD to process the order for the fastest processing time and the least expensive shipping charges.

Preferably, information used by RCD, such as color profiles (ICC profile), dot gain calibration and correction lookup tables, ink limiting and linearization files, waveform settings, and/or virtual printer drivers (VPD) etc. are stored on internet/cloud, and are accessible to multiple printers/users. This improves data security, and also allows the center computing device (CCD) to update the most recent and effective parameters, and decrease the probability of erroneous operations. Optionally, the RCD may be used in combination with an OEM Printer Driver or RIP (Raster Image Processor). In one embodiment of the invention, the entire information package may be formatted as an installable file (.exe file for MS Windows operating system, .dmg file for OS X operating system) allowing a user connected to the Internet to access and download for local installation prior to printing.

The remote computing device (RCD) is preferably connected with at least one printer with Ethernet protocol (IEEE 801.3). Other protocols may also be used such as Firewire (IEEE 1394), USB (Universal serial Bus) 2.0/3.0, Bluetooth (IEEE 802.15), WIFI (IEEE 802.11) etc. as long as the communication satisfies imaging file transmission speed requirements. In addition, the remote computing device (RCD) may connect with a digital display monitor, or a regular document-printing device, for the purpose of displaying operating instructions to human operators using the system. The relevant operating instructions are included in the metadata file received from the center computing device (CCD). At the end of each manufacturing process, feedback and status reports may be sent to the center computing device (CCD) along with various monitoring, cost analysis, customer notification, and/or inventory control purposes. Information regarding inventory and support control include, but are not limited to, consumables (ink, paper, intermediate media, shelf-life of consumable), workload, equipment and hardware status, weather (temperature, humidity, extreme weather condition), labor status, and local transportation status, etc.

The following programming examples show communications between CCD and RCD. The first example reports that a RCD is connected, and reports the status of a set of three printers available on that node with each carrying different inks, waveforms, and on-printer ink cartridge usage leveler. This allows center computing device (CCD) to determine whether any parameter changes should be made, or whether materials and supplies are needed, etc.:

```
HTTP POST http://cs.company.com/api/hadig25/report_status
    JSON request:
    {
            "auth_token" :
        "5ad0eb93697215bc0d48a7b69aa6fb8b",
            "host_name": "RCD-A",
            "printer": {
                    "name" : "Printer A",
                    "status" : "Online",
                    "inktype": "Sb05",
                    "waveform": "Sb35",
                    "cyan_level" : 36,
                    "magenta_level" : 84,
                    "yellow_level" : 54,
                    "black_level" : 35
            },
            "printer": {
                    "name" : "Printer B",
                    "status" : "Out of paper",
                    "inktype": "Pg01",
                    "waveform": "Std03",
                    "cyan_level" : 33,
                    "magenta_level" : 48,
                    "yellow_level" : 45,
                    "black_level" : 53
            },
            "printer": {
                    "name" : "Printer C",
                    "status" : "Offline",
                    "inktype": "Hb01",
                    "waveform": "Std A",
                    "cyan_level" : 0,
                    "magenta_level" : 0,
                    "yellow_level" : 0,
                    "black_level" : 0
            }
    }
    JSON response:
    {
            "success" : true
    }
```

In the following second example, the remote computing device (RCD) queries the center computing device (CCD) for pending jobs ready to print. The response indicates ready jobs and the unique URL at which the print data can be retrieved at each of the three printers at the location.

```
HTTP POST http://cs.company.com/api/hadig05/query_pending_jobs
    JSON request:
    {
            "auth_token" :      "5ad0eb93697215bc0d48a7
```

```
b69aa6fb8b",
            "host_name": "RCD-A"
    }
    JSON response:
    {
            "job": {
                    "printer_name" : "Printer A",
                    "job_name": "Sample job 1",
                    "copies" : 1,
                    "url":
        "http://cs.company.com/jobs/c2300c87-57a7-4acd-bd8d-
        f005ca7dca8e.prn"
            },
            "job": {
                    "printer_name" : "Printer B",
                    "job_name" : "Sample job 2",
                    "copies" : 1,
                    "url" :
        "http://cs.company.com/jobs/7653a379-7995-46f4-b51c-
        213b2e716785.prn"
            },
            "job": {
                    "printer_name" : "Printer A",
                    "job_name" : "Sample job 3",
                    "copies" : 2,
                    "url" :
        "http://cs.company.com/jobs/0074ac2e-24ce-4054-b910-
        1c3f7151ecf5.prn"
            }
    }
```

The Inventory/support center depicted in FIG. 6 may be in a remote location linked with the internet/cloud for information communication. It comprises material/consumable and hardware/equipment/supply stocks, and may be dispatched as needed. It may also provide supporting technical resources for diagnosis, repair, and/or training. A Just-in-Time (JIT) status of each and every remote fulfillment process center (via RCD) is monitored by the center through center computing device (CCD) to determine the best approach for operational actions.

While the medium onto which the image is printed for subsequent transfer may be paper, the medium may also be film, textile, metal or other substrates, for either direct or transfer printing applications. With transfer imaging processes, the printing medium may be called an intermediate substrate or medium. While different conveyance mechanisms for the medium may be employed, it is preferred that the medium is transported through the printer carriage in a direction perpendicular to the printhead scan direction. The printer must convey the medium/substrate through the printer during the printing process at a selected advancing velocity in order to achieve acceptable print quality. The surface characteristics of materials of films, metals and textiles vary to a material degree from paper and from each other. The surface friction of metal is substantially different from a textile such as a poly/cotton blend. Accordingly, the medium conveyance or transport mechanism of the printer when used to print media other than paper must be constructed for media of various thicknesses, rigidity and/or surface property at a desired velocity to ensure adequate ink droplet impact stability.

The inkjet printer is preferred to use factory sealed ink cartridges that contain the preferred aqueous ink comprising heat activatable dyes. In order to eliminate and/or minimize bacteria contamination, chemical reactions such as oxidation or reduction, jetting bubbling, satelliting, and other adverse impacts during the ink drop formation process, the liquid ink in the ink cartridge should have no more than 5.0 parts per million air, and is more preferred to have no more than 3.5 parts per million air, and is most preferred to have no more than 3.0 parts per million air after the cartridge is filled with liquid ink and sealed. The inkjet ink according to the invention tends to develop undesired crystallization due to presence of solids in the ink when the air volume in the filled cartridge is higher than the specified amount.

To prevent inconsistent color and/or product quality results, it is important that each participating remote fulfillment process center and associated printer(s), equipment, consumables, and supplies are calibrated using the same standard. For instance, color standards for textiles may be used to calibrate inks, substrates and equipment performance for each participating remote fulfillment process center. These often involve standard calibration equipment such as colorimeter, colorfast equipment, weatherometer, and/or detergent. A certification program using the standard may be elected and enforced prior to commercial applications for each remote fulfillment process center to achieve reliable manufacturing quality. Customized standards, or a combination of various standards, may be used to control and monitor consistent performance across the entire system.

In one embodiment, air is removed from the ink so that air is present in the ink at a level of no more than 3.5 parts per million prior to filling the cartridge. Degassing occurs during the filling process so that air is present at a level of no more than 3.5 parts per million after completion of the filling process. Air may be removed from the cartridge after it is filled and the ink has settled and has released additional dissolved air.

The preferred printer of the present invention allows a selection of ink droplet sizes printed from the print head of the printer that form each dot. Selection of ink droplet sizes is either automatic, based on imaging information and an algorithm calibrated from software or firmware, or manual and selected by the user for specific imaging requirements. Ink droplet size selection is employed to reduce or eliminate undesired dot gain or color matching produced at both jetting and jetting processes. For instance, 400% dot gain (resulting from the particular ink, color, tone mixing dithering, substrate, and heat activation parameters employed) may be controlled by using proportionally smaller ink droplets during jetting, thereby achieving a satisfactory result of half tonal precision. Preferably, at least three levels of droplet size are employed. These droplet sizes may be categorized as small (Sm), medium (Med) and large (Lg). The calibrated algorithm or user can select which category is preferred to produce the desired outcome. While smaller ink droplet size enhances precision, accuracy of image dots, and the total number of colors through dithering patterns, as well as avoiding undesired image continuous tone generation, larger ink droplet sizes improve imaging intensity, printing speed and ink usage effectiveness and efficiency. Careful balancing of the selections of droplet volume combination, through the use of the heat activatable ink characteristic data matrix and imaging algorithm, may result in an optimal outcome.

A volume of ink printed for each dot is preferred to be between 1 picoliter and 15 picoliters. Each Small droplet is preferred to have a volume of not more than 4 picoliters; each Medium droplet is preferred to have a volume of not more than 7 picoliters; and each Large droplet is preferred to have a volume of not more than 15 picoliters.

In a specific embodiment, the printer emits selectable ink droplet sizes of small droplets of not more than 2 picoliters; medium droplets of not more than 6 picoliters, and large droplets of not more than 9 picoliters. At the large droplet setting for four colors (CMYK), the printer delivers an ink dot of 36 (4×9) picoliters. Grey scale discharging of more than three volume levels of ink droplets may also be used for more sophisticated control.

In addition to printing resolution or ink droplet size, printed image quality is impacted by the number of colors that comprise the image. To reproduce a photographic image, fine details must be generated, and also, faithful reproduction of each of the original colors of each dot/pixel should be achieved, especially for transitional colors and/or facial (skin color) toning accuracy. In general, a photo quality printed image having resolution of no less than 1200 dpi (sometimes called native dot-per-inch resolution), and not less than total of half a million (500,000) colors should be achieved. High resolution printing, achieved by combining multiple colors of inks, and employing proper dithering or half-toning techniques, prefers color cell (the smallest color component in dithering or half-toning) sizes of not less than 300 cell units per inch. Though higher printing resolution may result in finer color cells, human eyes unaided by magnification normally cannot differentiate details beyond 300 units per inch. The present invention preferably uses a cyan, yellow, magenta, and black (4-color) ink set, with 600 to 1200 DPI printing resolution, with selectability of droplet sizes as described herein, and use of a dot gain algorithm for dot size control. These characteristics enable the process to produce photographic image quality at acceptable printing speeds.

The printhead may employ a relatively broad spectrum of driving force frequencies for the piezoelectric system. Variable driving force frequencies allow the production of well-defined ink droplets of variable volumes. "Well-defined ink droplets" means minimizing undesired non-jetting, tailing/Rayleigh breakup, elongation, satelliting or bubble bursting of the droplet at the tip of the surface of printing nozzles. Depending on the physical properties of the heat activatable ink, the driving force frequency may be between 5 kHz and 40 kHz, preferably between 8 to 20 kHz for small printers of the preferred embodiment.

The liquid inkjet ink has a preferred viscosity of between 2 to 100 cPs, with total water content of not less than 30% by weight of the total ink formulation. A preferred viscosity range is from 3 cP to 30 cP. A heat activatable colorant, such as sublimation dye, is present in the ink. The ink as printed comprises solid dye particles. The specific amount of the colorant(s) is supplied by the printer to the medium to achieve proper color intensity and image quality upon heat activation. The colorant is preferred to range from 1% to 15% by weight of the total ink formulation.

In order to avoid droplet formation difficulties and/or inconsistency of the jetting process due to the presence of high liquid viscoelasticity, polymeric constituents and materials, if used, are preferred to be below 500,000 in molecular weight. Dispersants, binders, physical property modifiers, rheology control agents, or thixotropic additives having such properties are preferably avoided in the ink formulation. More preferably, polymeric materials, either natural or synthetic, with molecular weights, if used, are below 300,000 in molecular weight. Heat activatable colorants suitable for use may include various disperse dyes or sublimation dyes with different activating energy levels. The colorants are activated or sublimed by applying heat to the printed substrate and/or transfer substrate. Generally, the heat activation temperature does not exceed 235° C., and most preferably, does not exceed 210° C. Examples of colorants, in varying ratios, include but are not limited, to C.I. Disperse Orange 13, 29, 31:1, 33, 49, 54, 55, 66, 73, 119 and 163; C.I. Disperse Red 4, 11, 54, 60 72, 73, 86, 88, 91, 92, 93, 111, 126, 127, 134, 135, 143, 145, 152, 153, 154, 159, 164, 167:1, 177, 181, 204, 206, 207, 221, 258, 278, 283, 288, 311, 323, 343, 348 and 356; C.I. Disperse Violet 33; C.I. Disperse Blue 4, 13, 56, 73, 113, 128, 148, 154, 158, 165, 165:1, 165:2, 183, 197, 201, 214, 224, 225, 257, 266, 267, 287, 358, 359, 360, 379, Disperse Brown 26, 27; and Disperse Yellow 5, 42, 54, 64, 79, 82, 83, 93, 99, 100, 119, 122, 124, 126, 160, 184:1, 186, 198, 199, 204, 224 and 237. Disperse or sublimation dyes with modified forms such as latent azo dyes capable of forming heat activatable dyes, grafted disperse/sublimation dyes, polymerized or encapsulated disperse/sublimation dyes may also be used.

Preferably, the present invention uses a 4-color ink set with cyan, magenta, yellow and black (CMYK) as the ink colors. Additional process or spot colors/special colors, including colors outside of the human perception range, may also be used to broaden color gamut, printing efficiency, or special color and/or texture effect. In some occasions, inks without heat activation properties may be used alone or in combination with inks comprising heat activatable colorants for intermediate medium printing surface conditioning, sublimation/diffusion masking, polymeric material transferring etc.

The colorant remains in the ink as a particulate that is conditioned for heat activatable ink jetting. A process of printing the ink onto the medium for subsequent heat activation or sublimation to achieve optimal imaging results is described. Suitable examples of inks for use in the system may be referenced from U.S. Pat. No. 8,425,029.

Other types of digital printing inks may also be used for the present invention, either in combination with the heat activatable inks or alone. Printing performance may be enhanced by using first level dot gain control where a direct printing technique is applied, and ink jetting parameter fine-tuning for various porous and/or non-porous substrates that are best suited for the selected ink type. Reactive dye ink, direct dye ink, acid dye ink, cationic dye ink, reactive disperse dye ink, pigment inkjet ink, crosslinkable/self-crosslinkable ink, hot-melt 3D printing ink, radiation or energy curable ink, such as ultraviolet radiation curable ink, may be used alone or in a mixed fashion. For instance, an 8-channel printer may use dual CMYK ink sets, with one set being heat activated inks and the other set being radiation curable inks. During the printing process, each of the two sets is being printed independently, using specific sets of printing control parameters including dot gain control, jetting frequency, waveform and ink droplet size, and the like directly from Center Computing Device (CCD), or indirectly through Remote Computing Device (RCD).

The reactive dye ink referred in the present invention is digital printing ink comprising reactive dye colorants. These are organic, water soluble dyes with chromophore containing substituents or functional groups that react with a substrate, resulting colorfast printed images on the corresponding substrate. Most commonly, the substrates are cellulosic materials such as cotton, wool, flax, and nylon. These materials contain hydroxyl, amine or other active functional groups in a structure that reacts with reactive dyes to create covalent bonds with proper treatment. Examples of suitable reactive dyes for digital printing purposes include, but are not limited to, Reactive Red 245, Reactive Orange 95, Reactive Orange 13. Specific examples are those under the trade names Procion H, Procion MX, Primimazin P, Reatex, Cibacron T, Levafix E, Solidazol, Remazol, Hostalan, Procinyl, Lansaol, Proxion T, respectively.

The acid dye inks referred in the present invention are digital printing inks comprising acid dye colorants. These are sulfuric, carboxylic or phenolic organic acidic dyes having affinity for cellulose fiber, and/or mercapto or amino functional groups in polypeptide chains of protein fibers, such as wool and silk, or with the amino groups in polyamide fibers such as Nylon 6 and Nylon 6.6. Examples of acid dyes suitable for inkjet ink printing include Acid Blue 260, Acid Blue 106, Acid Blue 258, Acid Green 28, Acid Black 194, Acid Yellow 79, Acid Orange 33, and Acid Violet 48. Acid dyes form covalent bonds with the mentioned substrate material through chemical reaction.

The pigment ink referred to in the present invention is a digital printing ink comprising organic or inorganic pigments. These pigments are colorants without substantial (sparing) solubility in the ink carrier system, with fine particle sizes, and formulated in a dispersant, binder, and/or other chemical agents/additives in addition to the carrier liquid. Pigment inks may be non-reactive or reactive in nature. The latter may comprise reactive ingredients that are capable of crosslinking with substrate materials, such as taught in U.S. Pat. No. 6,341,856. Examples of organic pigments suitable for the invention include, Pigment Black 7, Pigment Blue 1, Pigment Blue 15, Pigment Blue 15:2, Pigment Blue 15:3, Pigment Blue 56, Pigment Blue 61, Pigment Green 7; Pigment Red 2, Pigment Red 3, Pigment Red 4, Pigment Red 49:1, Pigment Red 49:2, Pigment Red 52:1, Pigment Red 52:2, Pigment Red 53:1, Pigment Red 53:3, Pigment Red 57:1, Pigment Red 63:1, Pigment Red 81, Pigment Red 112, Pigment Red 122, Pigment Red 144, Pigment Red 146, Pigment Red 166, Pigment Red 170, Pigment Red 171, Pigment Red 175, Pigment Red 176, Pigment Red 177, Pigment Red 179, Pigment Red 184, Pigment Red 185, Pigment Red 208, Pigment Red 120, Pigment Red 243, Pigment Red 266; Pigment Yellow 1, Pigment Yellow 3, Pigment Yellow 13, Pigment Yellow 17, Pigment Yellow 65, Pigment Yellow 75, Pigment Yellow 180, and Pigment Yellow 183. Inorganic pigment examples include, Pigment 32, Pigment Yellow 34, Pigment Yellow 36, Pigment Yellow 42, Pigment Red 101, Pigment Red 104, Pigment Blue 27, Pigment Blue 29, Green 17, Pigment Black 11 and Pigment Orange 21.

The radiation curable ink referred to in the present invention is a digital printing ink comprising radiation curable reactive constituents which can go through radiation initiated photopolymerization forming adhesion and cohesive bonding to the printed substrate materials. Most of the ink systems are acrylic monomers with photo-initiating agents, with or without colorants, and dried or cured after the printing on substrates by various types of radiation methods. Examples of curing methods include ultraviolet radiation, and electron beam radiation.

The 3D printing ink, or three-dimensional digital printing ink referred to is a digital additive method printing ink. Typically, a digital printing image file for a three-dimensional shape is created or modified with computer aided design (CAD) software from either scanned or photographically captured original files. An object to be imaged is then printed or built with multiple layers until the entirety is completed. 3D printing ink may be hot-melt in an embodiment, such as a thermal plastic polymeric material printed through a heated print head, where the material is in liquid form before accumulating and solidifying after jetting. Nylon (polyamide), ABS (acrylonitrile butadiene styrene), PPSF (polyphenylsulfone), PSU/PPSU (polyarylsulfone), PEI (Polyetherimide), PC (polycarbonate), are suitable hot-melt 3D printing polymeric materials. 3D printing ink may also be of the radiation curable type. In the latter case, each jetted ink layer is cured (or dried, or solidified) by a radiation energy source such as UV (ultraviolet radiation), electron beam (EB) and various types of laser radiation, forming a crosslinked or fused polymeric or sintered solid. Other types of 3D printing methods may also be used for the purpose of generating solid objects from 3D image files. Examples include, Direct Metallaser Sintering (DMLS), Fused Deposition Modeling (FDM), Stereolightography (SLA), Digital Light Processing (DLP), Fused Filament Fabrication (FFF), Melted and Extrusion Modeling (MEM), Laminated Object Manufacturing (LOM), Electron Beam Melting (EMB), or Laser Engineered Net Shaping (LENS).

In an exemplary imaging method according to the invention, a geographically remote computing device (RCD) transmits an image to a central computing device (CCD), FIG. 6. The image may be provided by a user of the geographically remote computing device (RCD) by creation of the image on the device or on another computing device. The image may be downloaded from another source. The geographically remote computing device (RCD) may be a computer, including, but not limited to a desktop computer, notebook computer, tablet computer or a cellular telephone with such capacity.

The central computing device (CCD) may communicate to the geographically remote computing device (RCD) an image or selection options comprising several images. The images may be manipulated as to form and appearance by a remote computing device (RCD), as demonstrated at FIG. 8a.

The geographically remote computing device (RCD) also communicates specifications of a substrate or substrates to be imaged to the central computing device (CCD). Optional substrates may be first communicated to the geographically remote computing device (RCD), with the user of the geographically remote computing device (RCD) selecting specifications of a substrate or substrates upon which the image is to be formed (FIG. 7a).

The central computing device (CCD) selects a geographically remote fulfillment printer. It is preferred that remote fulfillment printers are available at many locations, such as in most cities in world. The invention as described, in an embodiment, can image an intermediate substrate such as paper, using relative inexpensive desktop printers and heat activated inks, such as ink jet printer ink comprising sublimation dyes. A printing operation that will fill orders for customizing many substrates only costs a few hundred dollars, and therefore, such remote printers can be made available at minimal cost a location that is very near the consumer of the imaged substrate. Local fulfillment that is part of a geographically diverse distribution system is available according to the invention. In some cases, certain imaging requirements will require more sophisticated remote fulfillment printers. The central computing device (CCD) chooses the geographically remote fulfillment printer as a function of factors such as the selected image and substrate, printer capabilities, and the consumer's location. Image quality and consistency is maintained by the central computing device (CCD) selecting an appropriate geographically remote computing device (RCD) and providing printer the appropriate instructions, rather than the instructions for printing being determined locally at the printer.

The central computing device (CCD) communicates a graphic image file for the image to be printed, along with the specification(s) of the substrate to a fulfillment computing device (RCD) that is associated with the geographically remote fulfillment printer. The central computing device (CCD) may also select an ink specification from a plurality of ink specifications. The ink specification is communicated to the fulfillment computing device (RCD), FIG. 8b.

The central computing device (CCD) communicates printing instructions to the remote computing device or fulfillment computing device (RCD). Determining the instructions for the image and substrate at the remote computing device (RCD) maintains quality and consistency from location to location. These instructions may include, color management profile(s), ink limiting parameters and print head waveform. These instructions are selected by the central computer as a function of factors such as the printer capabilities, graphic image file requirements, the ink specification and the specification of the substrate. Other information communicated from the central computing device (CCD) to the remote fulfillment computing device (RCD) and or printer may include image resolution, ink droplet sizes, and frequency, such as piezo pulse frequency, pulse pressure and voltage to the geographically remote fulfillment printer (FIG. 9a).

The central computing device (CCD) and/or the fulfillment computing device (RCD) causes the geographically remote fulfillment printer to print the image selected using the ink selected and according to the information provided by the central computing device (CCD). The printer forms an image according to the image selected to be formed on a substrate according to the specification of the substrate selected from the remote computing device (RCD).

In one embodiment, the ink selected by the central computing devices (CCD) is a heat activated ink, such as an ink comprising sublimation dye. The geographically remote fulfillment printer prints the image selected on an intermediate substrate, which may be paper. The image is transferred by application of heat and pressure to the substrate, which is rarely paper, and is commonly a ceramic, metal or textile substrate. The substrate may be three dimensional in some instances.

In other embodiments, the image may be formed by directly printing on the selected substrate. The ink may be selected by the central computer (CCD) from, for example, dye based inks, heat sensitive inks, radiation curable inks, and 3D printing inks. The inks are selected as a function of factors such as the image to be printed, printer capabilities, and the selected substrates. Inks are described in more detail herein.

What is claimed is:

1. An imaging method, comprising the steps of:
a geographically remote computing device transmitting an image to a central computing device and the geographically remote computing device communicating to the central computing device a specification of a substrate upon which the image is to be formed;
the central computing device selecting a geographically remote inkjet printer from a plurality of geographically remote printers that are geographically separated from each other;
the central computing device communicating a graphic image file for the image selected to the geographically remote inkjet printer and the central computing device selecting and communicating a printing specification of the substrate to the geographically remote inkjet printer, wherein selection of the printing specification of the substrate by the central computing device is based upon the material from which the substrate is formed;
the central computing device selecting an ink and communicating a printing specification of the ink selected to the geographically remote inkjet printer, wherein the ink is liquid at the time of printing by the inkjet printer and the ink comprises solid colorants that are heat activatable;

the central computing device selecting and communicating a color management profile to the geographically remote inkjet printer, wherein the color management profile is selected by the central computer as a function of the graphic image file, the ink specification and the printing specification of the substrate;

causing the geographically remote inkjet printer to print a printed image according to the image selected using the ink selected and according to the graphic image file and color management profile supplied by the central computing device, and causing an image according to the image selected to be formed on the substrate according to the printing specification of the substrate, and subsequently heat activating the heat activatable colorants.

2. The imaging method according to claim 1, wherein the geographically remote inkjet printer prints the image selected on an intermediate substrate, and further comprising the step of transferring the image from the intermediate substrate to the substrate selected by application of heat to colorants forming the image.

3. The imaging method according to claim 1, wherein the substrate selected is not paper and is not primarily formed of plastic.

4. The imaging method according to claim 1, wherein the substrate selected and upon which the image is formed is a three dimensional object.

5. The imaging method according to claim 1, wherein the central computing device selects ink droplet sizes formed by the geographically remote inkjet printer as a function of the graphic image file, the ink specification and the specification of the substrate.

6. The imaging method according to claim 1, wherein the geographically remote computing device transmits a plurality of images to a central computing device, and the plurality of images are formed on a plurality of substrates.

7. The imaging method according to claim 1, wherein the central computing device communicates a plurality of images and a plurality of substrate specifications to the geographically remote computing device, and the user of the geographically remote computing device selects the image from the plurality of images and the substrate from the plurality of substrate specifications.

8. The imaging method according to claim 1, wherein the central computing device selects and communicates a piezo pulse frequency to the geographically remote inkjet printer, and wherein the piezo pulse frequency is a function of the specification of the ink selected and the specification of the substrate selected.

9. The imaging method according to claim 1, wherein the central computing device communicates an image resolution requirement to the geographically remote inkjet printer, wherein the image resolution requirement is determined by the central computing device as a function of the substrate to be imaged and specifications of the geographically remote inkjet printer.

10. The imaging method according to claim 1, wherein the substrate comprises a material chosen from a group of consisting of textiles, wood, leather and metal.

11. The imaging method according to claim 1, wherein the geographically remote computing device is located in a first city, the central computing device is located in a second city, and the geographically remote inkjet printer is located in a third city, and wherein the first city is geographically remote from the second city and the third city is geographically remote from the first city and the second city.

12. The imaging method according to claim 1, wherein the inkjet printer is a desktop inkjet printer.

13. An imaging method, comprising the steps of:

a geographically remote computing device transmitting an image to a central computing device and the geographically remote computing device communicating to the central computing device a specification of a substrate upon which the image is to be formed to the central computing device;

the central computing device selecting a geographically remote inkjet printer from a plurality of geographically remote printers that are geographically separated from each other;

the central computing device communicating a graphic image file for the image selected to a fulfillment computing device that is associated with the geographically remote inkjet printer and the central computing device selecting and communicating a printing specification of the substrate to the fulfillment computing device that is associated with the geographically remote inkjet printer, wherein selection of the printing specification of the substrate by the central computing device is based upon the material from which the substrate is formed;

the central computing device selecting an ink specification from a plurality of ink specifications and communicating the specification of the ink selected to the fulfillment computing device, wherein an ink according to the specification of the ink is liquid at the time of printing by the inkjet printer and the ink comprises solid colorants that are heat activatable;

the central computing device communicating a color management profile to the fulfillment computing device, wherein the color management profile is selected by the central computer as a function of the graphic image file, the ink specification and the specification of the substrate; and the fulfillment computing device causing the geographically remote inkjet printer to print the image selected using the ink selected and according to the graphic image file and color management profile supplied by the central computing device, and causing an image according to the image selected to be formed on the substrate that is selected according to the specification of the substrate selected, and subsequently heat activating the heat activatable colorants.

14. The imaging method according to claim 13, wherein the geographically remote inkjet printer prints the image selected on an intermediate substrate, and further comprising the step of transferring the image from the intermediate substrate to the substrate selected by application of heat to colorants forming the image.

15. The imaging method according to claim 13, wherein the substrate selected is not paper and is not primarily formed of plastic.

16. The imaging method according to claim 13, wherein the substrate selected and upon which the image is formed is a three dimensional object.

17. The imaging method according to claim 13, wherein the central computing device selects ink droplet sizes formed by the geographically remote inkjet printer as a function of the graphic image file, the ink specification and the specification of the substrate.

18. The imaging method according to claim 13, wherein the geographically remote computing device transmits a plurality of images to a central computing device, and the plurality of images are formed on a plurality of substrates.

19. The imaging method according to claim 13, wherein the central computing device communicates a plurality of images and a plurality of substrate specifications to the geographically remote computing device, and the user of the geographically remote computing device selects the image from the plurality of images and the substrate from the plurality of substrate specifications.

20. The imaging method according to claim 13, wherein the central computing device selects and communicates a piezo pulse frequency to the fulfillment computing device, and wherein the piezo pulse frequency is a function of the specification of the ink selected and the specification of the substrate selected.

21. The imaging method according to claim 13, wherein the central computing device communicates an image resolution requirement to the fulfillment computing device, wherein the image resolution requirement is determined by the central computing device as a function of the substrate to be imaged and specifications of the geographically remote inkjet printer.

22. The imaging method according to claim 13, wherein the substrate comprises a material chosen from a group of consisting of textiles, wood, leather and metal.

23. The imaging method according to claim 13, wherein the geographically remote computing device is located in a first city, the central computing device is located in a second city, and the geographically remote inkjet printer is located in a third city, and wherein the first city is geographically remote from the second city and the third city is geographically remote from the first city and the second city.

24. The imaging method according to claim 13, wherein the inkjet printer is a desktop inkjet printer.

\* \* \* \* \*